Aug. 31, 1948.    C. A. BROWN    2,448,170
MIXER VALVE AND CONTROL
Filed March 10, 1944    2 Sheets-Sheet 1
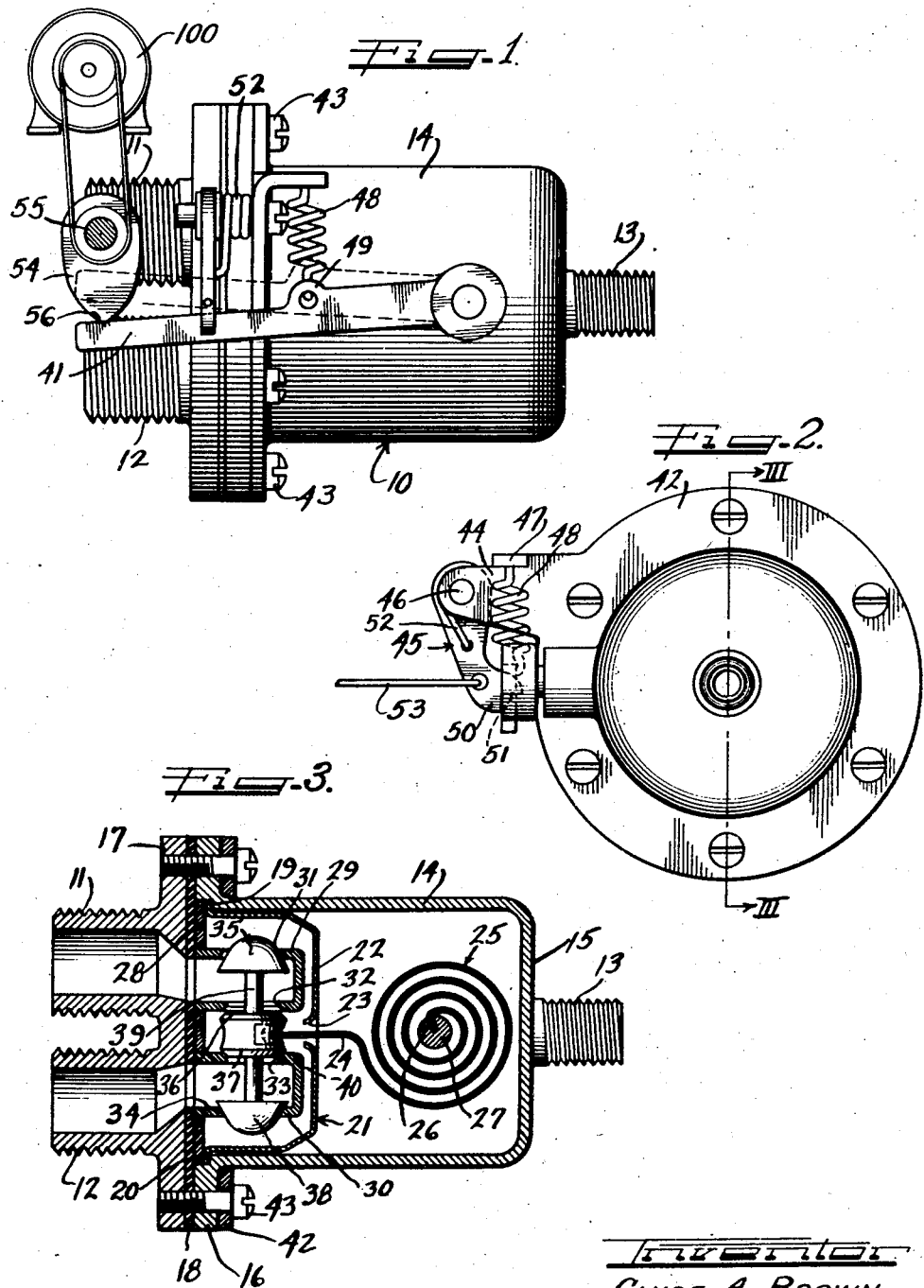
Inventor
CLYDE A. BROWN.

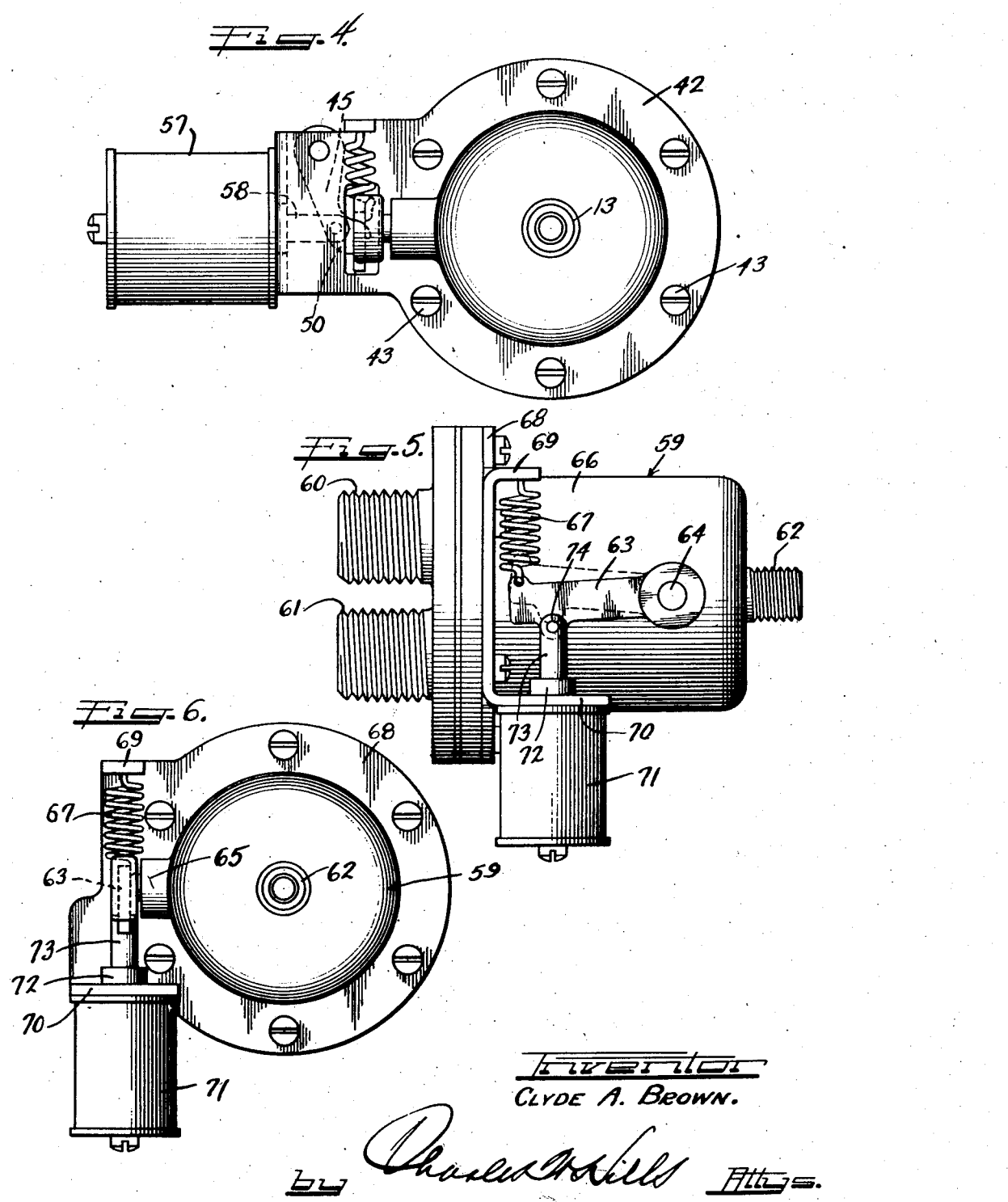

Patented Aug. 31, 1948

2,448,170

UNITED STATES PATENT OFFICE 2,448,170

MIXER VALVE AND CONTROL

Clyde A. Brown, Chicago, Ill., assignor to The Dole Valve Company, Chicago, Ill., a corporation of Illinois Application March 10, 1944, Serial No. 525,850

3 Claims. (Cl. 236—12)

This invention relates to a mixer valve and control and more particularly to an automatic temperature controlled mixer valve in which means is provided for controlling the fluid delivery temperature.

Automatic temperature controlled mixer valves are used in a wide variety of fluid systems. While these automatic temperature controlled mixer valves are normally set for some definite predetermined fluid delivery temperature, and while they frequently have means for manually adjusting the temperature setting, it is sometimes desirable to provide means for remotely controlling the temperature setting of the mixer valve, such, for example, as in an automatic washing machine.

One of the principal features and objects of the present invention is to provide an automatic temperature controlled mixer valve having novel means for altering the temperature setting of the valve unit.

A further object of the present invention is to provide a novel mixer valve and control which is economical to manufacture and which is reliable in use.

A further object of the present invention is to provide a mixer valve having novel means for changing its setting between either of two predetermined temperature settings.

A still further object of the present invention is to provide a novel automatic temperature controlled mixing valve unit having electrically operated means for changing the temperature setting thereof.

Another and further object of the present invention is to provide a novel automatic temperature controlled mixing valve unit whose temperature setting may be varied by cam operated means.

Another and still further object of the present invention is to provide a novel automatic temperature controlled mixing valve unit in which means is provided for changing the temperature setting from one predetermined position to another predetermined position, and in which additional means is provided for rendering said changing means inoperative.

The novel features which I believe to be characteristic of my invention are set forth with particularity in the appended claims. My invention itself, however, both as to its organization, manner of construction and method of operation, together with further objects and advantages thereof, may best be understood by reference to the following description, taken in connection with the accompanying drawings, in which:

Figure 1 is an elevational view of a mixer valve and control embodying the novel teachings of the present invention;

Figure 2 is an end view of the mixer valve and control unit shown in Figure 1;

Figure 3 is a vertical sectional view of the unit shown in Figures 1 and 2 as taken along the line III—III of Figure 2;

Figure 4 is an end view of modified form of the present invention;

Figure 5 is an elevational view of a third embodiment of the present invention; and Figure 6 is an end view of the embodiment of the present invention illustrated in Figure 5.

Referring to the embodiment of the invention illustrated in Figures 1 to 3 of the drawings, there is shown therein an automatic temperature controlled mixer valve 10 which is arranged to be connected to two separate sources of fluid under pressure of different temperatures through the hot fluid inlet nipple 11 and the cold fluid inlet nipple 12. By way of example and not by way of limitation, the hot fluid inlet nipple 11 may be connected to a source of water at a relatively high temperature, such, for example, as water having a temperature of 170° or 180°, while the cold fluid inlet nipple 12 may be connected to the conventional cold water tap. The water is mixed in the automatic temperature controlled mixer valve 10 and delivered through the mixed fluid outlet nipple 13 to a fluid delivery pipe or other apparatus (not shown).

The automatic temperature controlled mixer valve 10 includes a main housing member 14 which is preferably a casting having the outlet nipple 13 formed in the end wall 15 thereof and having a flange 16 at its opposite open end. The open end of the casting 14 is closed by an end plate 17 which has integrally formed thereon the inlet nipples 11 and 12. A gasket 18 is preferably disposed between the end plate 17 and the flange 16.

The open end of the casting 14 is provided with a shoulder 19 on which is seated the outer marginal lip 20 of a cup shaped inner housing member 21. The inner housing member 21 provides a hot and cold fluid mixing chamber in a manner presently to be described. The end wall 22 of the housing member 21 has a central opening or port 23 therein through which extends the free end 24 of a spirally coiled bimetallic thermostat 25. The inner end 26 of the thermostat 25 is mounted on a shaft 27 which extends through the wall of the casting 14 and is supported thereby.

Also carried on the shoulder 19 on top of the marginal lip 20 is a plate 28. Two inlet chamber members 29 and 30 are mounted on the plate 28 and these chambers are in open communication through the gasket 18 and the end plate 17 with the inlet nipples 11 and 12 respectively. The fluid inlet chamber members 29 and 30 are provided with ports defined by the marginal edges 31, 32, 33 and 34. These ports 31 to 34 are axially aligned and disposed at right angles to the general direction of extension of the free end portion 24 of the thermostatic element 25. These ports 31 to 34 are arranged to be opened and closed by means of a set of balanced valves 35, 36, 37 and 38, which are mounted on a valve stem 39. The valve 35 is arranged to close the port 31 by movement from within the chamber member 29 toward the valve seat provided by the marginal edge 31, which defines the port. The valve portions 36 and 37 are located on the exterior side of the chamber members 29 and 30 and are formed on opposite ends of a valve block as shown. The valve member 38 is arranged to close the port 34 by movement from the interior of the chamber member 30 toward the port 34. The free end portion 24 of the thermostatic element 25 is connected through a ball joint 40 to the valve block which includes the valve portions 36 and 37.

From the above description it will be apparent that the automatic temperature controlled mixer valve is of the balanced valve type and is arranged to automatically maintain a constant predetermined temperature in the mixed fluid delivered through the mixed fluid outlet nipple 13. The valve members are shown in a position in Figure 3 where they would be when no fluid is flowing through the mixer valve 10 or when the temperature of the fluid coming in through the hot fluid inlet nipple 11 is so low that the valve members have been moved to their extreme positions. In practical operation, however, the valve members 35, 36, 37 and 38 will generally be in some intermediate position, which intermediate position will vary depending upon the fluctuation in the temperature and pressure of the fluids entering the hot fluid inlet nipple 11 and the cold fluid inlet nipple 12. The relative position of the valve members 35 to 38 determine the proportioning of the hot and cold fluids, and due to the fact that they are actuated by the thermostatic element 25, the mixed fluid which is the result of the mixture of the fluid from the hot and cold fluid inlet nipples in the mixing chamber 21, is maintained at a constant predetermined temperature level. This constant predetermined temperature level may be varied by relatively limited angular movement of the shaft 27 on which the inner end of the thermostatic element 25 is mounted. To this end the shaft 27 projects through the casting wall 14 and is provided with a temperature setting lever 41 which is arranged for limited movement, such, for example, as between the position shown by the full lines in Figure 1 and the position shown by the dotted lines in Figure 1. When the lever is in the position shown by the full lines in Figure 1, it is set at some predetermined temperature which is relatively higher than that represented by the dotted line position. By way of example and not by way of limitation, the temperature setting represented by the full lines in Figure 1 might be 140° while the temperature setting represented by the dotted lines in Figure 1 might be 100°.

As is clearly shown in Figures 1 to 3 of the drawings a ring-shaped member 42 is seated against the flange 16 on the casting 14 and is bolted in place by the bolts 43 which extend through the ring 42, the flange 16, the gasket 18, and are threaded into the end plate 17, thus retaining all of these respective elements in assembled position. The ring-shaped member 42 is provided with a projecting arm 44 on which is pivotally mounted a latch 45 by means of a pin 46. The arm 44 is provided with an ear 47 to which one end of a tension spring 48 is secured. The opposite end of the tension spring 48 is secured to an intermediate portion 49 of the temperature adjusting lever 41. The temperature adjusting lever 41 is thus normally biased to its cold position.

As is clearly shown in Figure 2 of the drawings, the latch 45 is provided with a nose 50 which is notched out as at 51 to fit around a portion of the temperature adjusting lever 41. This latch 45 is normally biased to its latched position by means of a biasing spring 52, as shown in Figure 1. When the latch 45 is in engagement with the temperature adjusting lever 41 it is apparent that the temperature adjusting lever 41 cannot return to its cold position, but is retained in its hot position. The latch 45 is arranged to be disengaged from the temperature adjusting lever 41 by means of a Bowden wire or other connecting medium 53.

The automatic temperature adjusting lever 41 is arranged to be moved from its cold position to its hot position by a timer driven cam 54 which is mounted on a rotating shaft 55 driven from a timer motor 106. The shaft 55 is preferably arranged to be driven in a clockwise direction, as viewed in Figure 1 of the drawings, and the cam 54 includes a cam surface 56 which moves the lever 41 to its hot position when it is in engagement with the projecting nose portion 56 of the cam 54. As the cam 54 continues to rotate the lever 41 follows the cam due to the action of the biasing spring 48, provided, of course, that the latch 45 is in a disengaged position. It will thus be apparent that the automatic temperature controlled mixer valve 10 may be arranged to deliver fluid at one predetermined temperature at one stage of a cycle of operations, and at a second and different temperature at another stage in the cycle of operations, depending upon the position of the timer driven cam 54. If, for any reason, it is desired to constantly deliver fluid at a relatively high predetermined setting, the Bowden wire 53 is released to permit the latch 45 to move into engagement with the lever 41 when the lever is in its hot position. This prevents return of the lever 41 to a cold position upon continued rotation of the cam 54.

If the lever 41 is in a cold position to start, and the Bowden wire 53 is released, the biasing action of the spring 52 on the latch 45 causes it to move over into a position where the notched out portion 51 will engage the lever 41 the first time that the lever 41 is moved to its hot position. It will therefore be apparent that the thermostatic device may be set to deliver fluid first at a relatively cool temperature and then upon continued rotation of the timer operated cam 54 the temperature setting of the mixer valve may be changed to a higher predetermined temperature setting, which higher predetermined temperature setting is maintained for subsequent operation irrespective of continued rotational movement of the cam 54.

A modified form of the present invention is illustrated in Figure 4 of the drawings. The automatic temperature controlled mixer valve shown in Figure 4 is similar to that shown in Figures 1 and 2 with the exception that in the place of a Bowden wire 53 a solenoid 57 is provided having an armature 58 which is connected to the latch 45 in the vicinity of the notched-out nose 50. When the solenoid 57 is energized the armature 58 is drawn into the solenoid 57 and the latch 45 is held out of engagement with the temperature adjusting lever 41. When the solenoid is deenergized the latch is returned to its latching position by means of the biasing spring 52 as shown in Figure 1. The remaining portion of the construction of this second embodiment of the present invention is the same as that described in connection with Figures 1 to 3 of the drawings.

A third embodiment of the present invention is illustrated in Figures 5 and 6 of the drawings. More particularly, there is shown in Figures 5 and 6 an automatic temperature controlled mixing valve 59 having hot and cold fluid inlet nipples 60 and 61, mixed fluid outlet nipple 62. The internal construction of the automatic temperature controlled mixer valve 59 is similar to that described in connection with Figures 1 to 3 of the drawings, and includes a temperature adjusting lever 63 mounted on a shaft 64 journaled in the boss 65 of the casting 66 which forms the housing of the automatic temperature controlled mixer valve 59.

The automatic temperature adjusting lever 63 is biased to its relatively cold position by means of a biasing spring 67, the cold position being represented by the dotted lines in Figure 5 and the hot position being represented by the full line of the lever 63 in Figure 5 of the drawings.

The automatic temperature controlled mixer valve 59 is provided with a ring-like member 68 similar to the ring 42 described in connection with Figures 1 and 2 of the drawings with the exception that in addition to the ear 69 which is provided for the biasing spring 67, an additional bracket arm 70 is provided, on which a solenoid 71 is mounted. The solenoid 71 is provided with an armature 72 which is arranged to be drawn into the solenoid 71 upon energization of the latter. The armature 72 includes an extending finger 73 which is pinned as at 74 to the temperature adjusting lever 63.

From the above description it will be apparent that upon energization of the solenoid 71 the temperature adjusting lever 63 is arranged to be moved to its hot position while upon deenergization of the solenoid 71 the temperature adjusting lever 63 is moved to its cold position by the tension spring 67. This form of the invention provides a ready and convenient control means for selecting either of two desired predetermined temperature settings. The solenoid 71 is provided with a suitable energization circuit (not shown) which may be closed either manually or through a timer operated switch (not shown).

Although the above described embodiments of the present invention are particularly useful when employed in conjunction with an automatic washing machine, it will be apparent that they may be employed in a wide variety of fluid supply systems which require a change in the temperature of the fluid delivered at different times in a predetermined cycle of operations.

While I have shown certain particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. Fluid control means comprising a fluid mixing device having an adjustable temperature responsive means for automatically proportioning fluid of normally different temperatures to maintain the resulting mixed fluid at a predetermined temperature level, a movable adjusting arm for said temperature responsive means pivotally mounted at one end on an exterior wall of said mixing device, means biasing said arm toward one extreme pivotal position corresponding to a first temperature setting of said temperature responsive means, cam control means engaging the other end of the arm for shifting said arm to a second pivotal position corresponding to a second temperature setting of said temperature responsive means, and a latch mounted on said mixing device and optionally movable between latching and releasing positions relative to said arm, said latch engaging said arm at an intermediate point thereof when said arm is in said second position only, thereby retaining said arm in said second position irrespective of the subsequent action of said control means.

2. Fluid control means comprising a fluid mixing device having an adjustable temperature responsive means for automatically proportioning fluid of normally different temperatures to maintain the resulting mixed fluid at a predetermined temperature level, a pivoted adjusting arm for said temperature responsive means mounted on said mixing device and movable in a plane immediately adjacent and substantially parallel to an exterior wall of said mixing device, means biasing said arm toward one extreme pivotal position corresponding to a first temperature setting of said temperature responsive means, control means for shifting said arm to a second pivotal position, corresponding to a second temperature setting of said temperature responsive means, a latch mounted on said mixing device and movable in a plane perpendicular to said plane of movement of said arm between latching and releasing positions relative to said arm, said latch engaging said arm in latching relationship only in said second position of said arm, thereby retaining said arm in said second position irrespective of the subsequent action of said control means, resilient means biasing said latch to said latching position, and remote control means for retaining said latch in its said released position.

3. Fluid control means comprising a fluid mixing device having an adjustable temperature responsive means for automatically proportioning fluid of normally different temperatures to maintain the resulting mixed fluid at a predetermined temperature level, a pivotally movable adjusting arm for said temperature responsive means mounted on an exterior wall of said mixing device, means biasing said arm toward one extreme pivotal position corresponding to a first temperature setting of said temperature responsive means, control means for shifting said arm to a second pivotal position, corresponding to a second temperature setting of said temperature responsive means, a latch mounted on said mixing device and movable between latching and releasing positions relative to said arm, said latch engaging said arm in latching relationship only in said second position of said arm, thereby retaining said arm in said second position irrespective of the subsequent action of said control means, means for biasing said latch to said latching position, and electrically operated means for holding said latch against the action of its biasing means in said released position.

CLYDE A. BROWN.

REFERENCES CITED

The following references are of record in the file of this patent:

UNITED STATES PATENTS

| Number | Name | Date |
|---|---|---|
| 1,597,773 | Dodge | Aug. 31, 1926 |
| 1,853,325 | Stewart | Apr. 12, 1932 |
| 1,879,772 | Snediker | Sept. 27, 1932 |
| 2,064,053 | Balzer | Dec. 15, 1936 |
| 2,123,920 | Andersson | July 19, 1938 |
| 2,207,865 | Knight | July 16, 1940 |
| 2,287,810 | Lund | June 30, 1942 |
| 2,321,641 | Andersen | June 15, 1943 |

FOREIGN PATENTS

| Number | Country | Date |
|---|---|---|
| 370,533 | Great Britain | Apr. 14, 1932 |